Aug. 22, 1961     L. C. BRISSON     2,997,139
BRAKE ACTUATOR SYSTEM
Filed April 8, 1957     3 Sheets-Sheet 1
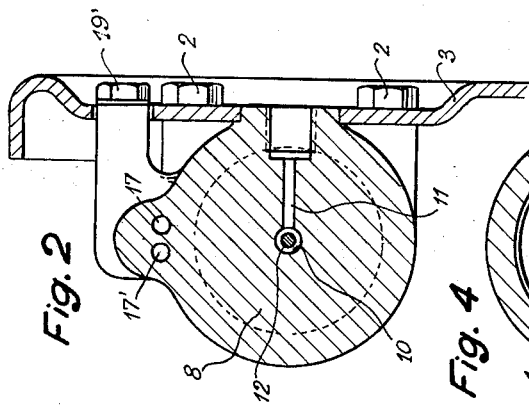
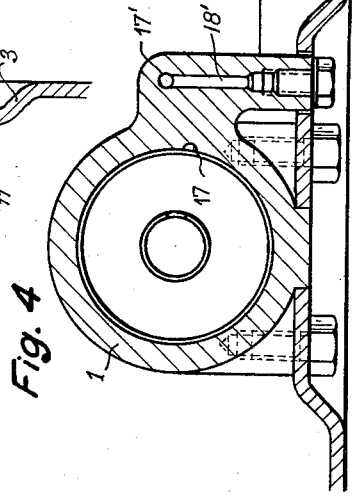
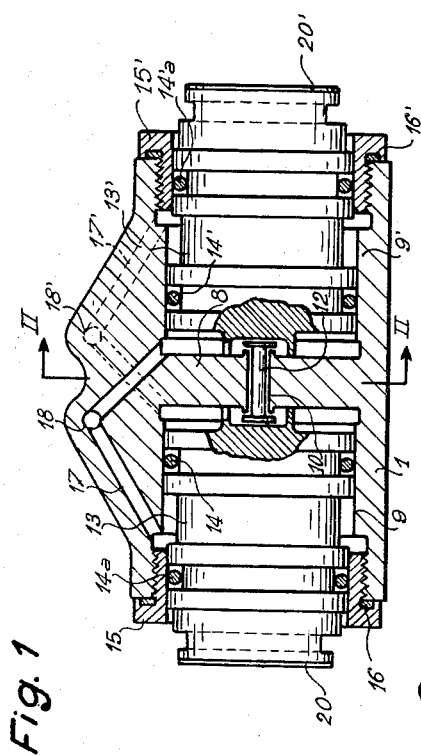
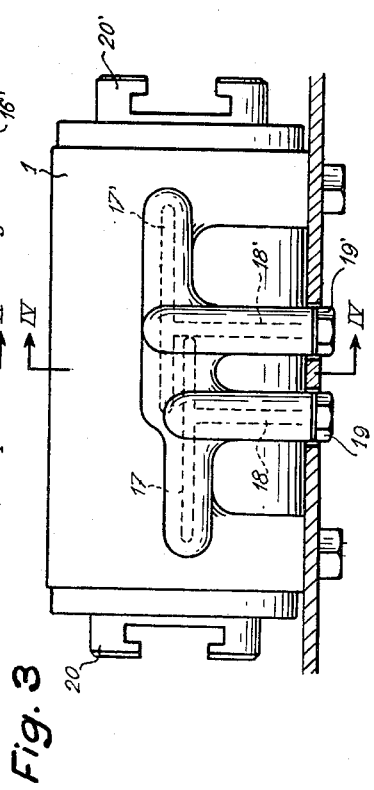

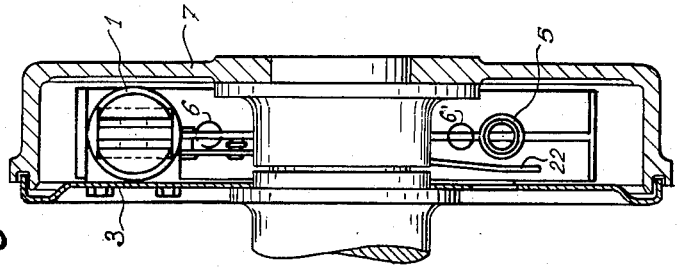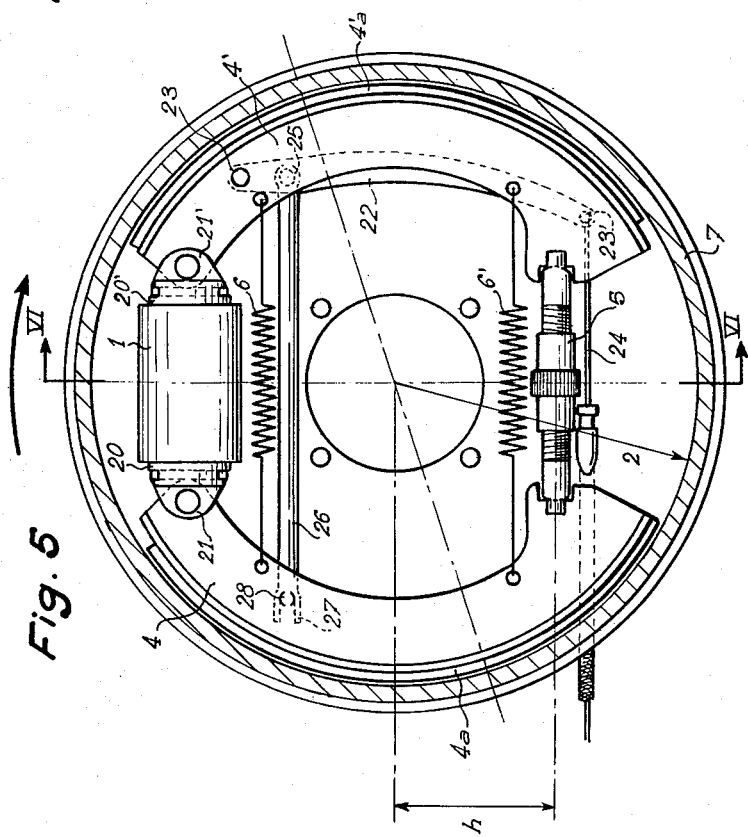

Aug. 22, 1961 L. C. BRISSON 2,997,139
BRAKE ACTUATOR SYSTEM
Filed April 8, 1957 3 Sheets-Sheet 3

United States Patent Office 2,997,139
Patented Aug. 22, 1961

2,997,139
BRAKE ACTUATOR SYSTEM
Louis Charles Brisson, "Le Vieux Logis," Vineuil, France
Filed Apr. 8, 1957, Ser. No. 651,477
Claims priority, application France Apr. 16, 1956
18 Claims. (Cl. 188—78)

This invention relates to brake actuator systems, and more especially though not exclusively, to actuator systems for brakes of the type wherein a pair of segmental brake shoes engageable with the surface of a rotatable brake drum have their one ends interconnected by a coupling free floating element or link, while their other ends are connected to the actuator to be forced outwards into engagement with said drum on operation of the actuator. Such brake systems are sometimes described as self-centering brakes.

This type of brake is advantageous in that it possesses a high power ratio, i.e. a high ratio of brake torque developed (based on a given drum diameter and a given average value of friction coefficient between the brake linings and drum) to the input torque applied (based on a unit radial displacement of the brake shoes). Such brakes have a drawback however in that the braking action tends to be irregular. The degree of irregularity of braking action is sometimes defined in terms of the so-called "regularity index." This regularity index is the ratio between the respective braking torques developed by the brake for a given input torque, when the coefficient of friction of the brake linings on the drum assumes a maximum and a minimum value, which values may be taken as respectively equal to 0.45 and 0.2.

It is, then, a general object of this invention to improve the regularity index in a brake system of the type specified above, while retaining a high brake power ratio therein.

Another object is to provide improved brake actuator means which utilize the differential effect of the rotation of the drum surface upon the two oppositely-acting brake segments, in order to achieve improved smoother and more uniform braking action.

A further object of the invention is to provide a brake actuator system of the type specified, arranged for two-way transmission of reaction force between the actuator and each brake shoe connected therewith, i.e. for the transmission of stresses both in compression and in tension.

Further objects will appear from the ensuing disclosure.

According to a broad aspect of the invention, there is provided in a brake system comprising a rotatable brake drum and brake shoes engageable therewith, a differential actuator connected with said shoes to force them into engagement with the drum, said actuator including means responsive to the different reaction forces on the shoes to impose differential engagement forces on said shoes. In accordance with the invention as applied to an hydraulic actuator, the said means may comprise pressure fluid connections for picking off the reaction pressure exerted on one brake shoe and applying it to the piston, connected with the other brake shoe.

In one specific embodiment of an hydraulic actuator according to the invention, there is provided an actuator body having two coaxially aligned cylinder bores therein separated by a partition, with pressure fluid inlet orifices connected with both bores on opposite sides of the partition, means for alternately sealing said orifices, and piston means slidable in the bores and having their outer ends coupled to the respective brake segments, differential pressure means being provided whereby the so-called "primary" piston—i.e. that piston connected to the particular brake shoe which is aided rather than retarded in its outward movement relative to the point of actuation by the rotational effect of the brake drum—will be in a state of equilibrium under the combined effect of the actuating fluid pressure, the reaction pressure transmitted from its attached primary brake shoe, and an additional fluid pressure proportional to the abutment force exerted on the other or so-called "secondary" segment, i.e. that segment which is retarded in its outward movement by the rotation of the brake drum.

The above and further objects, features and advantages of the invention will be made clear from the ensuing description in which exemplary embodiments of the invention will be described, with reference to the accompanying drawings wherein:

FIG. 1 is a longitudinal view in section of an hydraulic brake control system according to the invention;

FIG. 2 is a section on line II—II of FIG. 1, and further includes a showing of the means attaching the hydraulic system to a stationary back plate;

FIG. 3 is a plan view corresponding to FIG. 1;

FIG. 4 is a section on line IV—IV of FIG. 3;

FIG. 5 is a section viewed axially of the brake drum, of an example of a brake system wherein the hydraulic system of FIGS. 1-4 is used in normal braking operation and a floating control system for emergency braking;

FIG. 6 is a section on line VI—VI of FIG. 5;

Figure 7:
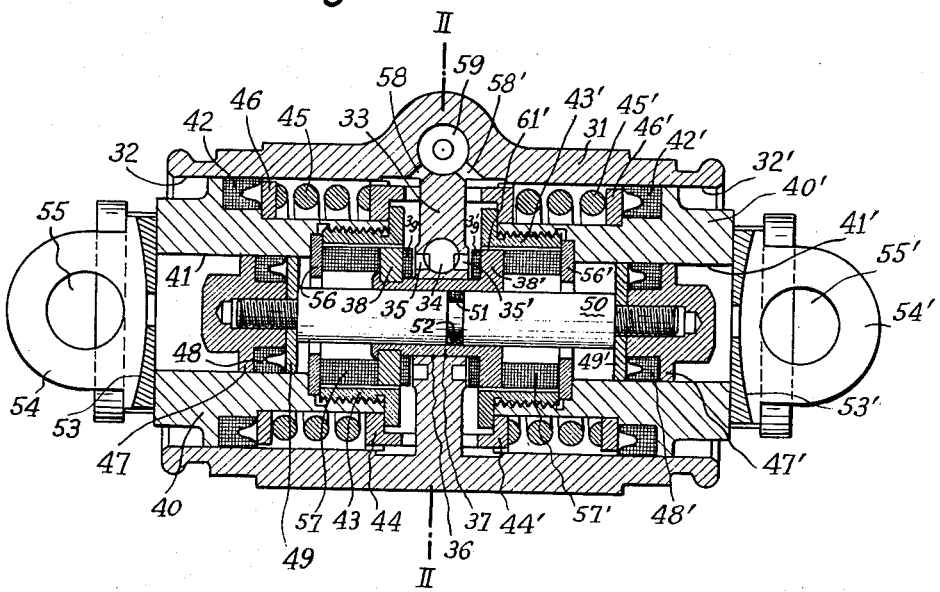
FIG. 7 is a longitudinal section of another embodiment.

As shown in FIGS. 1 to 4, a brake control system according to the invention comprises a cylinder 1 conventionally secured as by means of the bolts 2 to a back plate 3 (see FIG. 5) between the adjacent ends of brake shoes or segments 4 and 4'. The brake shoes 4 and 4' are of the self-centering or floating type and their opposite ends are interconnected by a free floating link 5, and are biased towards each other by springs 6 and 6'. The shoes 4 and 4' are fitted with conventional brake linings 4a and 4'a adapted to engage the brake drum 7 on application of the brake.

As clearly shown in FIG. 1 to 4, the brake cylinder 1 is formed with a central partition 8 intermediate two bore sections 9 and 9'. The partition 8 is formed with an axial duct 10, connecting with a fluid inlet duct 11 leading from a suitable master cylinder, not shown. The duct 10 is adapted to be selectively sealed at one or the other of its ends by means of a dual valve assembly 12.

Slidable in the bores 9 and 9' of cylinder 1 are pistons 13 and 13' supporting piston seal rings 14—14a and 14'—14'a. The seal rings 14 and 14' engage the surfaces of bores 9 and 9' directly while rings 14a and 14'a which are of lesser diameter than rings 14 and 14' engage the surfaces of a pair of bushings 15 and 15' screwed into the ends of the bores of the cylinder and including end flange portions engaging the end surfaces of the cylinder with interposed sealing gaskets 16, 16'.

A pair of ducts 17 and 17' are formed in the upper part of the cylinder 1; duct 17 connects the cylinder chamber between seals 14 and 14a with the cylinder chamber between partition 8 and seal 14'; and duct 17' similarly connects the cylinder chamber between seals 14' and 14'a with the cylinder chamber between partition 8 and seal 14.

Connecting with the ducts 17 and 17' respectively, are bleed ducts 18 and 18' normally sealed by means of the screw plugs 19 and 19'.

The outer end of each piston 13 and 13' is formed with an extension 20 and 20' whereby the pistons may be coupled in the manner shown in FIG. 5 with the related ends of brake segments 4 and 4'. In the idle condition illustrated the pistons are abutting the partition 8 thereby positioning the dual valve member 12 at a centered position wherein both ends of duct 10 are open, as shown in FIG. 1.

The system so far described operates as follows: the system is filled with brake fluid and screw plugs 19 and 19' are tightened to seal the bleed ducts 18 and 18'. Assume the brake drum 7 is rotating clockwise (FIG. 5). When fluid is delivered by the usual master cylinder or pump into inlet duct 11 the pistons 13 and 13' are forced apart, forcing the brake segments 4 and 4' into engagement with the drum. As is well-known in the operation of this type of brake, on engagement of the segments with the drum a strong degree of unbalance arises between the reaction forces against the primary segment 4' and the secondary segment 4. The outward movement of the secondary piston 13 therefore is retarded or opposed whereas primary piston 13' is aided and continues to move outwards. Piston 13' as it moves compresses the liquid between the seals 14' and 14'a. Because of the unbalance between the pressures the valve 12 seals the left hand end of duct 10 (the end directed towards piston 13). The pressure of the liquid compressed in the chamber between seals 14' and 14'a acts by way of the duct 17' upon the piston 13 to tend to displace the latter to the left, an amount of displacement different from and less than that of the piston 13'.

It will readily be understood that depending on the ratio between the diameters of seals 14' and 14'a and 14 and 14a the ratio between the displacements thus imparted to pistons 13 and 13' (by reason of ducts 17, 17') will be strictly predetermined in a manner depending only on the ratio between the diameters at 14' and 14'a and 14 and 14a. This provides a convenient means of matching the characteristics of the resulting brake to any particular application contemplated. All that need be done (assuming equal diameters for 14 and 14') is to select the diameters of the seals 14a and 14'a and replace the corresponding bushings 15 and 15' to match them with the selected diameters.

If the direction of drum rotation is reversed, the operation of the parts within the brake cylinder is correspondingly reversed, with the piston 13 operating as described above for piston 13' and vice versa.

In the exemplary embodiment of FIG. 1, the pistons 13 and 13' are shown as having equal diameters but it is evident that different diameters may be selected therefor if required for any particular application.

The hydraulic brake control system described may be coupled with any suitable brake segment system. Certain types of brake segment systems however are especially well suited for such systems. As already mentioned, this is especially true of the so-called self-centering type of brake segments, comprising at least two segments each mounted in a fully free-floating condition and connected in series; in other words the two free-floating segments are mounted with their one ends coupled to the outer end faces of the pistons 13 and 13' of the hydraulic control system and with the opposite ends of the segments interconnected by a link such as 5 (FIGS. 5 and 6).

In order to derive maximum benefit from the hydraulic brake control system of the invention, it is desirable to use a brake of the type just specified, having a high, though usual value of the friction coefficient, but having an amplifying factor (i.e. the ratio of the reaction force of the secondary segment to the opening force of the primary segment) such that it passes from an infinite positive value to an infinite negative value and then returns to a finite negative value, as the friction coefficient of the brake linings increases. Such a condition is easily fulfilled by positioning the connecting link 5 at a comparatively short distance from the center of the brake drum, as illustrated in FIG. 5.

The substance of the last paragraph may be otherwise stated as follows: The primary brake shoe is acted upon by three main forces viz; (1) the actuator force of the piston (2) the force of reaction of the drum on the shoe; (3) the force exerted by the link 5. These three forces must be in equilibrium and for simplicity of explanation may all be considered horizontal as viewed in FIG. 5. Thus when the drum reaction force acting toward the left lies between the link pressure force acting toward the right and the actuating piston pressure force, the latter force will necessarily be toward the right or positive. If the link pressure force be moved up or the drum reaction force be moved down until these two forces are in line with each other, the piston actuation force will be zero. Furthermore, if the link pressure force be between the drum reaction force and the piston actuation force, the latter must necessarily be toward the left or negative. It may be said that as the coefficient of friction of the brake lining increases the position of the drum reaction force moves lower.

The spacing $h$ from the link to the drum center may be selected at a suitable value which will depend on the angular extent of the linings, the positioning of the linings, the friction characteristics thereof, the desired law of variation of the braking torque, and other analogous parameters. In the type of brake described above and illustrated in FIG. 5 comprising a link 5 interconnecting the segments 4 and 4', the spacing $h$ should preferably be such as to satisfy the condition $h/r<0.6$, wherein $r$ is the drum radius. When using this type of brake segments with a link 5 positioned as just stated, it is essential that the segments be connected with the pistons by way of a positive connection capable of withstanding reaction stresses in either sense. That is the reason why, in the illustrated example, the outer ends of pistons 13 and 13' are so formed as to enable the pistons to be connected as shown in FIG. 5, for example by way of the pivoted ears 21 and 21' to the adjacent ends of segments 4 and 4'. With such an arrangement the reaction force between the pistons and segments may be directed in either sense, but will necessarily always be normal to the faces of the pistons.

My system is not confined to a fully hydraulic brake system.

In the exemplary construction shown in FIGS. 5 and 6, a brake control system of the fully hydraulic type just described is combined with a floating type of control, the former being used for normal braking operation and the latter for emergency braking. The floating control system acts upon the same segments 4 and 4' as those used for normal braking. The floating emergency control comprises a lever 22 having one end 23 pivoted to segment 4' and the opposite end 23' pivoted to a remote control or cable element 24.

Pivoted at 25 to the emergency link 22 is one end of a cross link 26 the other end of which is connected to segment 4 by way of a pin-and-slot connection 27 including a pin 28 projecting from segment 4 slidable in a slot defined by a forked extremity of the link 26. Because of the presence of the hydraulic control features heretofore described, that is, the passages 17, 17' and the differential pistons and other parts, the operation of the floating system will be substantially the same as that described in connection with the full hydraulic system. The mechanical spreading of the shoes by the lever 22 and the strut 26 will move the pistons the same as they were moved hydraulically and the pressure through the passages 17, 17' will be developed in the same way. Thus the floating system does not operate the same as the now known or conventional mechanical brakes.

A further description of the full hydraulic system will now be given.

Assuming first a low friction coefficient, say of the order of 0.2, for example the operation of the hydraulic control system is similar to what was described previously. The muscular force exerted by the driver through the brake pedal and the master cylinder or pump (not shown) is converted into hydraulic pressure developed against the inner face of the particular piston corresponding to the primary segment (for a given assumed direction of rotation of the wheel and brake drum), e.g. segment 4' in the example shown herein. The valve 12 is sealed against the end of duct 10 directed towards the other piston 13. The force present on the inner face of said piston, divides itself into two components:

(a) A mechanical force applying the primary segment against the drum, and (b) An hydraulic opposing force applied to the primary piston 13' owing to the difference in diameter between the two seal rings of the piston 13', as already explained. This is due to the pressure obtaining in the second hydraulic circuit through 17' being proportional to the abutment force on the secondary segment since said pressure is communicated through duct 17' to the face of the piston acting on the secondary segment.

Thus it is seen that the operating force exerted by the driver is balanced by two forces in the same direction, and that, the smaller the amplification coefficient (i.e. the smaller the ratio of the secondary segment abutment force to the primary segment applying force), the larger will be the amount of residual force available for forcing the primary segment outward. It should be borne in mind that an increase in the coefficient of friction will cause the drum reaction pressure to be lower (FIG. 5) on the shoe. If we now assume a higher value of frictional coefficient such that the ratio of the abutment force on the secondary segment to the outward force on the primary segment is equal to plus or minus infinity, the operation of the system in the initial stages will be identically the same as described previously, but since the ratio of abutment force to application force now is infinite, the force exerted by the driver upon the inner end of the primary piston will be wholly balanced by the hydraulic resistant pressure applied on the primary piston owing to the difference in diameter between the primary piston rings, since the pressure obtaining in the second hydraulic circuit is still proportional to the abutment force on the secondary segment. There is no residual pressure available for forcing the primary segment outwards and the outward pressure on this segment is therefore zero. Actually therefore it is seen that this type of brake is controlled by way of the secondary segment. This may be termed tension brake control.

Assuming next that the friction coefficient is high and imparts a high, negative, value to the ratio of the secondary segment abutment force to primary segment outward force, the initial stage of operation again remains the same as before. But since in the present situation it is necessary, in order for the segment to be in equilibrium, that a negative force be applied to the primary segment, it will be seen that the primary piston will at all times be in a state of equilibrium under the resultant effect of three forces:

The positive control force;

A hydraulic resistant force in the second hydraulic circuit proportional to the abutment force on the secondary segment; and A mechanical force due to the primary segment, also positive in this instance, i.e. acting to retain the primary segment.

It can readily be understood without having to resort to a mathematical analysis, that the type of hydraulic control described above provides a means of correcting the chief drawback of self-centering brake systems, namely their lack of regularity. The actual force applied to the primary segment is an inverse function of the friction coefficient. In effect the system behaves as if it sensed the brake torque outward force ratio and regulated the outward force so as to maintain the ratio of the brake torque to the control force substantially constant.

It will be seen from the foregoing that by the use of the hydraulic brake control system described, a somewhat paradoxical and at any rate an unexpected result is had, in that a highly uniform brake operation is achieved through the use of highly irregular brake segments.

The result of combining the hydraulic control with self-centering brake segments, as described, is that a brake assembly is obtained in which an optimum compromise is struck between the power coefficient and the regularity index.

Moreover, by suitably selecting the ratio between the diameters of pistons 13 and 13', the performance of the brake can be matched in an optimum manner to the conditions of any particular application, while retaining the same segments. This is a great advantage from a manufacturing standpoint since a common type of segment may thus be used for a wide range of different brakes.

The operation of the emergency brake device will now be described. If the construction is such that $h/r > 0.6$, no two-way coupling of the pistons with the segments need be provided, and the operation of the emergency hand brake floating control is then entirely conventional; the abutment of the secondary segment is of course effected against one of the hydraulic control pistons, and the brake operates as a conventional self-centering brake.

Now considering the case, mentioned previously as forming a characteristic feature of the invention, wherein $h/r < 0.6$, owing to the positive mechanical connection between pistons 13 and 13' and segments 4 and 4', any outward displacement of the segments through the auxiliary device controlled by way of remote control element 24 (FIG. 5) is accompanied by an automatic displacement of the pistons. Owing to the pressures arising in at least one of the hydraulic circuits (in this case the circuit 17'), the valve 12 is seated on the left side and the operation is similar to that of the hydraulic control, with the sole exception that the operating force is now imparted by the mechanical device.

Another form of the invention will now be described with reference to FIGS. 7 and 8. As there shown, a hydraulic control system comprises a cylinder 31 with two coaxial bore sections 32 and 32', separated by a fixed partition 33. The partition has a fluid inlet orifice 34 connecting with two annular grooves 35 and 35' and an axial bore 36 in which a bushing 37 is freely slidable, the bushing serving to interconnect rigidly a pair of spaced valves 38 and 38' fitted with yielding annular seals or gaskets 39 and 39'. Slidably mounted in the cylinder bores 32 and 32' are the pistons 40 and 40' formed with coaxial bores 41 and 41'.

Seal rings 42 and 42' are mounted on the pistons 40 and 40'. Nuts 43 and 43' are threaded as shown into the pistons 40 and 40' and flanged rings 44 and 44' are pressed thereagainst by compression coil springs 45 and 45' having their opposite ends abutted against rings 46 and 46' seated against shoulders formed in the pistons. The bias force of springs 45 and 45' is calibrated on manufacture so that the resulting compression force is just higher than the reaction force developed by the brake segment biasing spring upon the pistons 40 and 40' in the operative condition of the brake. The brake segments are not illustrated in connection with FIGS. 7 and 8 since the construction and arrangement thereof may be generally similar to what was shown in FIGS. 5 and 6.

Slidable in the bores 41 and 41' of pistons 40 and 40' are auxiliary pistons 47 and 47' including the seal rings 48 and 48' and a pair of stop rings 49 and 49' pressed against shoulders formed on a connecting rod 50 provided with threaded end extensions over which the auxiliary pistons 47 and 47' are screwed as shown. The connecting rod 50 extends through bushing 37 and is formed with an annular groove 51 in which a seal 52 is inserted. The ends of pistons 40 and 40' are formed with coupling extensions to the brake segments, said couplings comprising parts 53 and 53' formed with milled grooves therein adapted to receive coupling elements 54 and 54' formed with openings 55 and 55' for insertion of coupling pins for pivotal connection with the brake segments.

The threaded nuts 43 and 43' further serve to retain a pair of rings 56 and 56' which act as abutments both for the pistons 47 and 47' by way of the rings 49 and 49', and for a pair of resilient pads 57 and 57' having their opposite ends seated against the valves 38 and 38'.

Figure 8:
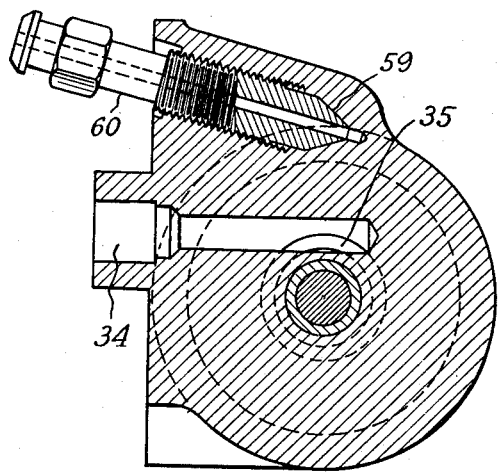
FIG. 8 is a cross section on line II—II of FIG. 7.

The cylinder 31 is formed with two vent ducts 58 and 58' connecting with a flared opening 59 adapted to be sealed by a hollow tubular screw plug 60 (see FIG. 8). With this plug screwed home, the connection between the vents 58 and 58' and between each vent or bleed to the atmosphere are sealed.

In the idle condition the valves 38 and 38' are centered in an open position and the pistons 40 and 40' are seated against the valves through the intermediate yielding pads 57 and 57'. The opposite ends of pistons 40 and 40' are abutted against the partition 33 through the rings 44 and 44' connected with said pistons by way of the yielding spring connection biased to a predetermined initial pressure. This device operates as follows.

When pressure fluid is delivered by way of inlet 34 the pistons 40 and 40' are urged apart, but the unbalance between the reaction forces due to the brake segments engaging the rotating brake drum results in the piston 40' on the secondary segment side tending to be retracted and to exert strong pressure upon the liquid behind it. In FIG. 7 the direction of drum rotation is assumed to be opposite to that shown in FIG. 5 and described heretofore.

Assuming the secondary segment is that segment connected to piston 40', piston 40' tends to be retracted and exerts pressure on the liquid behind it. This pressure unbalance is communicated to the space on the right of valve 38' by way of the passage 61' defined between the end face of this valve and the inner surface of nuts 43' and acts to seat the valve 38'. Since the pressure adjacent piston 40' is higher than the pressure adjacent piston 40, the auxiliary pistons 47 and 47' are displaced bodily to the right until piston 47 is stopped by abutment with the piston 40, through intermediate rings 49 and 56. At this time the piston 40 is in equilibrium under the combined action of three forces:

(a) The hydraulic control pressure exerted on the surfaces of pistons 40 and 47;

(b) Reaction force of the primary segment applied by way of couplings 53—54 to piston 40; and (c) The hydraulic resistant pressure from piston 47' acting through connecting rod 50, piston 47 and rings 49 and 56, which pressure is a function of the abutment reaction of the secondary segment.

Thus it is seen that the primary piston 40 strikes a condition of balance quite similar to what was described in connection with the embodiment previously disclosed.

It is noted that, in the form of embodiment now being described (FIG. 7), the provision of the yielding abutments (springs 45 and 45') between the pistons 40 and 40' and the partition 33, and the provision of the yielding pads 57 and 57' between the pistons 40 and 40' and the valves 38 and 38', prevents the possibility of the piston coupled with the secondary segment applying a high mechanical force on the partition 33 directly or through valves 38 and 38'. Such a condition would otherwise tend to arise in the event of inward displacements of the pistons and/or inadequate supply of power fluid, and would result in a loss of secondary hydraulic pressure and in defective brake operation. On the other hand, with the yielding connections described above, an inward displacement of piston 40 or 40' of substantial extent may occur without causing any substantial mechanical reaction upon partition 33 and the hyradulic equilibrium described above will be sure to occur. The yielding connections described may of course be embodied in other ways than illustrated, as by any suitable arrangement of springs, spring washers or the like.

The construction of hydraulic brake control device described with reference to FIGS. 7 and 8 is applicable to a braking system of the type illustrated in FIGS. 5 and 6 or any other suitable type.

The foregoing description will show that the hydraulic brake control construction of FIGS. 7 and 8 has advantages over that of FIGS. 1–4 in that it facilitates machining operations and simplifies assembly and adjustment. Moreover, since the various piston seal rings are at all times operating in the same direction, simpler types of seals may be used than have to be used in the construction of FIG. 1 to 4 since in the latter the piston rings were required to operate in either direction depending on the sense of rotation of the brake drum.

It will be understood that many modifications and departures may be made in and from the constructional embodiments described and illustrated without exceeding the scope of the invention as defined in the ensuing claims.

I claim:

1. A brake system comprising a rotatable brake drum, a fixed brake plate, a pair of segmental brake shoes engageable with said drum, means coupling first adjacent ends of said brake shoes to each other, and actuator means including a part referenced to said brake plate and connected with the other adjacent ends of the brake shoes to force said shoes into engagement with said drum, the direction of rotation of the drum determining a primary shoe having resulting aided engagement with said drum and a secondary shoe having retarded engagement with said drum, whereby said primary shoe will transmit to said actuator means via said coupling means and said secondary shoe a large torque-reaction force reflecting primarily said aided engagement, said actuator means further including means responsive to said large torque-reaction force and reacting against said part for applying a retracting force to said primary shoe, whereby the load on said primary shoe is relieved and shared with said secondary shoe.

2. A braking system comprising a rotatable brake drum, a fixed brake plate, a pair of segmental brake shoes engageable with the drum on opposite sides of the center of rotation thereof, means coupling first adjacent ends of the brake shoes to each other, hydraulic actuator means mounted on the brake plate and connected with the other adjacent ends of the brake shoes to urge the shoes outwardly into engagement with the drum, the rotation of the drum aiding the movement of one and opposing the movement of the other brake shoe at said other adjacent ends of the brake shoes, and hydraulic means responsive to the motion of said opposed brake shoe end in the general direction of drum rotation to hydraulically apply a force to said aided brake shoe end in a direction to urge the last said brake shoe end inwardly away from the drum.

3. In a brake system comprising a rotatable brake drum, a fixed brake plate, and a pair of brake shoes engageable with the drum, a differential actuator referenced to said brake plate and connected with adjacent ends of the shoes to force them into simultaneous engagement with the drum, whereby for a given direction of drum rotation one shoe is primary and the other secondary, and for the opposite direction of rotation the other shoe is primary and the one secondary, said actuator including means reversibly acting for exerting a retraction force on whichever brake shoe happens to be the primary shoe depending on the sense of drum rotation.

4. In a brake system comprising a rotatable brake drum, a fixed brake plate, and brake shoes engageable with said drum, whereby for a given direction of drum rotation one shoe is primary and the other secondary, a differential actuator including a part mounted on said brake plate and connected with said shoes to force them into engagement with the drum and including means responsive to the reaction forces on the shoes to impose a lesser engagement force on said primary shoe than on said secondary shoe.

5. In a brake system comprising a rotatable drum, a fixed brake plate, and a pair of brake shoes engageable with said drum, a differential actuator carried by said brake plate and connected with adjacent ends of the shoes to force them into engagement with the drum, said actuator comprising a pair of pistons having outer ends connected with said ends of the shoes, pressure fluid means operable on said pistons to force them outwards, and fluid connecting means to connect a reaction pressure exerted on one piston to urge the other piston in a retracted direction.

6. In a brake system comprising a rotatable drum, and a pair of brake shoes engageable with said drum, an actuator comprising, a pair of coaxially aligned bores each having an axially inward larger-diameter portion and an outward smaller-diameter portion, pistons slidable in said bores and each having annular seals engageable with said respective bore portions, coupling means on the outer end of each piston and respectively connected to said brake shoes for two-way transmission of forces between the piston and shoe, each piston defining within its bore, a first chamber between an inner end surface of the bore and an inner one of said piston seals and a variable-pressure second chamber between said inner piston seal and an outer piston seal, pressure fluid inlet means connected with both said first chambers, and passage means connecting each of said first chambers to the opposite second chamber.

7. The brake system claimed in claim 6, valve means in the fluid inlet means to each first chamber and responsive to the pressure in said opposite second chamber for sealing the inlet means into said first chamber.

8. The brake system claimed in claim 6, an axial duct inter-connecting both first chambers and connected with said fluid inlet means, and a pair of rigidly interconnected valve elements adapted to be seated alternately on one or the other end of the duct to seal either first chamber from said inlet means.

9. The brake system claimed in claim 6, bushings removably fittable into the outer end portions of said bores to define said smaller-diameter bore portions.

10. In a brake system comprising a rotatable drum, and a pair of brake shoes engageable with said drum, an actuator comprising, a pair of coaxially aligned bores each having an inward larger-diameter portion and an outward smaller diameter portion, differential pistons slidable in the bores and each having a pair of axially-spaced seal rings respectively slidable in said bore portions, means on the outer end of each piston and connected with a different brake shoe of said system for two-way force transmission between the piston and shoe, each piston defining a first chamber between an inner end surface of the bore and the inner one of its said seal rings and defining a variable-pressure second chamber between said seal rings, a duct coaxial with said bores and interconnecting both said first chambers, pressure fluid inlet means connected with said duct intermediate said first chambers, a valve stem extending freely through the duct and having a pair of valve heads at the ends thereof within said first chambers adapted selectively to seat against either end of said duct to seal the connection from said inlet means to either of said first chambers, an inner end surface on each piston adapted to engage a related valve head to center said valve stem within said duct, and passage means connecting each first chamber with the opposite second chamber, whereby continued outward displacement of said other piston will compress fluid entrapped within said one first chamber and other second chamber to develop a balancing force acting on said other piston.

11. In a brake system, a rotatable drum, and a pair of brake shoes engageable with said drum, an actuator comprising, a pair of coaxially aligned bores, a main piston slidable in each bore, means on the outer end of each main piston and connected with a respective brake shoe of said system for two-way force transmission between the piston and shoe, a pressure fluid inlet opening into each bore inwardly of the main piston therein, valve means selectively sealing either inlet, and differential pressure means responsive to a reaction force transmitted between a brake shoe and the main piston connected therewith for acting on the valve means to seal the related fluid inlet and transmitting said reaction force to the other main piston.

12. A brake system as claimed in claim 11, wherein said differential pressure means comprises different diameter sections in each respective bore, corresponding-diameter seal portions on each main piston respectively slidable in said bore sections, whereby each main piston defines with its bore a first chamber between the inner end walls of said piston and bore and a second chamber between said piston seal portions, and duct means connecting each second chamber with the other first chamber.

13. A brake system as claimed in claim 11, wherein said differential pressure means comprises coaxial bores within said main pistons, auxiliary pistons slidable in said second mentioned bores, an axial bore interconnecting said first mentioned bores, a rod extending through said last mentioned bore and having said auxiliary pistons attached to opposite ends thereof, a sleeve slidable in said last mentioned bore around said rod and having valve means on opposite ends of said sleeve for selectively sealing either of said inlets, and stop means mounted on said main pistons for abutting said auxiliary pistons.

14. A brake system as claimed in claim 1, wherein the means coupling said first adjacent ends of the brake shoes is spaced from the center of said drum a distance less than about 0.6 times the drum radius.

15. A brake system for a brake system as claimed in claim 11 wherein stop means are provided between main pistons and a common bottom of said coaxially aligned bores.

16. A brake system for a brake system as claimed in claim 13 wherein elastic buffers are provided between said main pistons and said slidable sleeve supporting valve means.

17. A braking system comprising a rotatable brake drum, a fixed brake plate, a pair of segmental brake shoes engageable with the drum on opposite sides of the center of rotation thereof, means coupling first adjacent ends of the brake shoes to each other, actuator means including a part referenced to said brake plate and connected with the other adjacent ends of the brake shoes to simultaneously urge the shoes generally radially outwardly into engagement with the drum, the rotation of the drum aiding the radial movement of one and opposing the radial movement of the other brake shoe at said other adjacent ends of the brake shoes, and means reacting against said part and responsive to the motion of said opposed brake shoe end in the general direction of drum rotation to apply a force to said aided brake shoe end in a direction to urge the last said brake shoe end inwardly away from the drum.

18. The brake system as set forth in claim 17, said actuator means to urge said other adjacent ends of the brake shoes generally radially outwardly comprising hydraulic means including first and second piston means coupled respectively to said brake shoes, whereby energizing of the hydraulic means urges the piston means in opposite directions, said means responsive to movement of the opposed brake shoe end including coupling means between said piston means.

(References on following page)

References Cited in the file of this patent

UNITED STATES PATENTS

| | | |
|---|---|---|
| 1,786,856 | Madden | Dec. 30, 1930 |
| 1,799,227 | Gunn | Apr. 7, 1931 |
| 1,972,829 | Oliver | Sept. 4, 1934 |
| 1,998,533 | Brisson | Apr. 23, 1935 |
| 2,034,977 | De Lavaud | Mar. 24, 1936 |
| 2,213,948 | Bowden | Sept. 10, 1940 |
| 2,285,310 | Strebinger | June 2, 1942 |
| 2,375,392 | Stelzer | May 8, 1945 |
| 2,382,268 | Stelzer | Aug. 14, 1945 |
| 2,385,168 | Stelzer | Sept. 18, 1945 |
| 2,513,015 | Fike | June 27, 1950 |
| 2,657,768 | Hunyady | Nov. 3, 1953 |

FOREIGN PATENTS

| | | |
|---|---|---|
| 464,240 | Italy | June 25, 1951 |